United States Patent
Vertanen

[19]

[11] Patent Number: 6,109,167
[45] Date of Patent: Aug. 29, 2000

[54] ACTUATOR WITH AXIALLY MOVABLE O-RINGS BETWEEN PISTON AND HOUSING

[75] Inventor: Mark W. Vertanen, Creston, Iowa

[73] Assignee: Gits Manufacturing Company, Creston, Iowa

[21] Appl. No.: 09/090,482

[22] Filed: Jun. 4, 1998

[51] Int. Cl.[7] .............................. F16J 9/00; F02D 23/00
[52] U.S. Cl. .............................. 92/253; 60/602; 251/63.6
[58] Field of Search .............................. 60/602; 251/63.5, 251/63.6; 92/248, 250, 253

[56] References Cited

U.S. PATENT DOCUMENTS

| | | |
|---|---|---|
| 2,234,777 | 3/1941 | Puffer . |
| 2,955,578 | 11/1960 | Flessate et al. . |
| 3,188,922 | 6/1965 | Cruse . |
| 4,098,085 | 7/1978 | McDowell . |
| 4,120,156 | 10/1978 | McInerney . |
| 4,171,936 | 10/1979 | Hageman et al. . |
| 4,245,953 | 1/1981 | Milton et al. . |
| 4,418,924 | 12/1983 | Mack . |
| 4,463,564 | 8/1984 | McInerney . |
| 4,499,732 | 2/1985 | Szczupak et al. . |
| 4,530,640 | 7/1985 | Macinnes . |
| 4,745,753 | 5/1988 | Tadokoro et al. . |
| 4,840,347 | 6/1989 | Ariizumi et al. ....................... 251/63.4 |
| 5,046,317 | 9/1991 | Satokawa . |
| 5,148,678 | 9/1992 | Ueda et al. . |
| 5,165,445 | 11/1992 | Vertanen . |
| 5,172,552 | 12/1992 | Elperin et al. . |
| 5,205,125 | 4/1993 | Potter . |
| 5,214,919 | 6/1993 | Jiewertz et al. . |
| 5,231,831 | 8/1993 | Leavesley . |
| 5,240,027 | 8/1993 | Vertanen . |
| 5,267,829 | 12/1993 | Schmidt et al. . |
| 5,269,144 | 12/1993 | Miller et al. . |
| 5,479,978 | 1/1996 | Zenkich . |

FOREIGN PATENT DOCUMENTS

| | | |
|---|---|---|
| 58-110821 | 1/1983 | Japan . |
| 59-153920 | 1/1984 | Japan . |

*Primary Examiner*—Andrew M. Dolinar
*Assistant Examiner*—Katrina B. Harris
*Attorney, Agent, or Firm*—Zarley, McKee, Thomte, Voorhees & Sease

[57] ABSTRACT

An actuator for a turbocharger includes a piston axially movable within a housing. The piston has a plurality of annular grooves thereon, and a plurality of O-rings are loosely restrained respectively in the annular grooves. Thus, the O-rings are axially movable within the grooves prior to moving with respect to the housing, so as to reduce the hysteresis which normally accompanies movement of the piston within the housing.

12 Claims, 2 Drawing Sheets

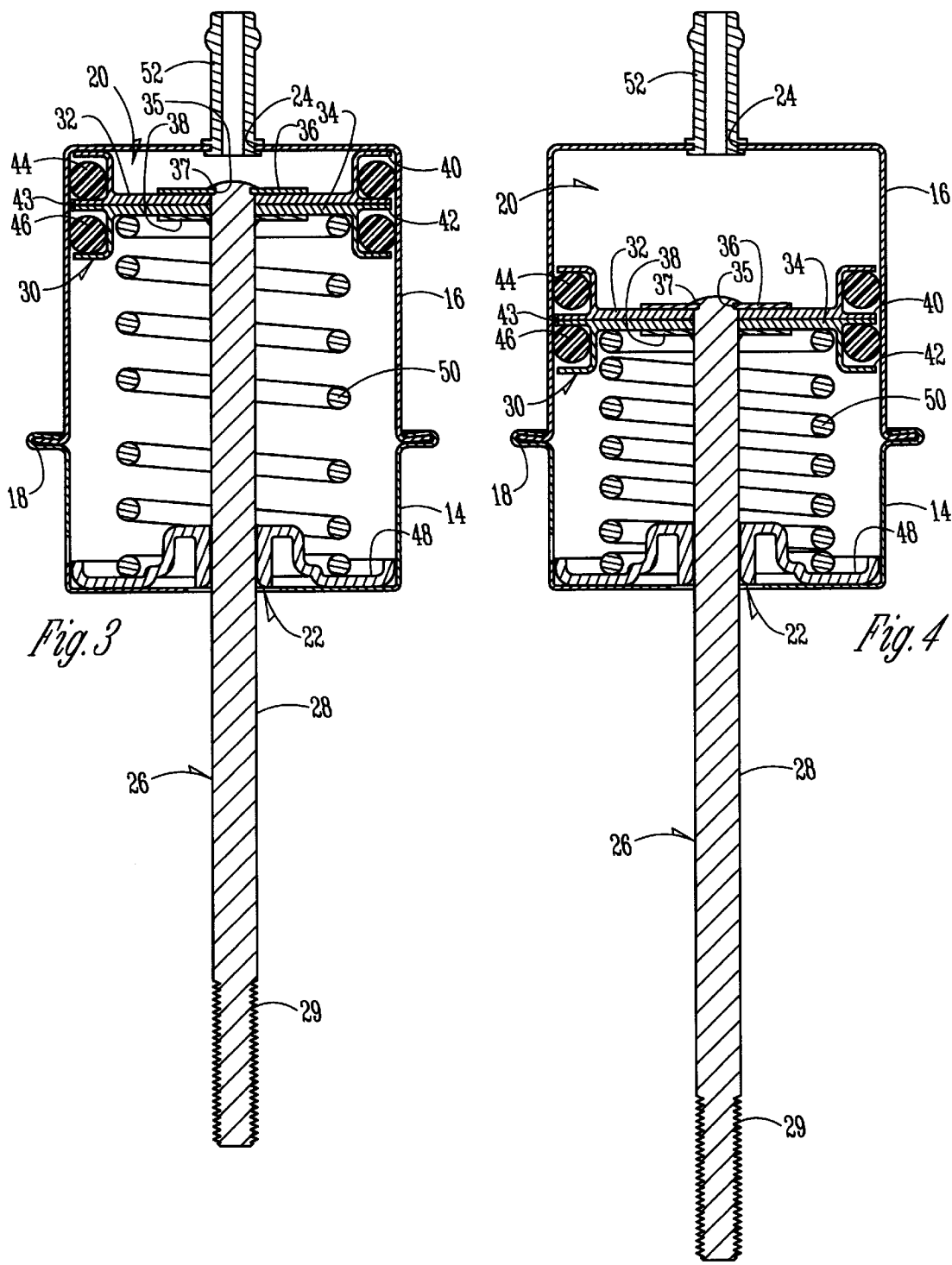

ACTUATOR WITH AXIALLY MOVABLE O-RINGS BETWEEN PISTON AND HOUSING

BACKGROUND OF THE INVENTION

The present invention relates to actuators, including but not limited to those used on turbochargers for automotive engines.

One key component of a turbocharger for an automotive engine is the actuator. As part of a closed loop control system, the actuator senses the pressure in the turbocharger and responds accordingly by varying the position of the turbocharger. The position of the waste gate valve, in turn, controls the turbocharger pressure sensed by the actuator. Although various known turbocharger actuators are available, many of them are plagued with a hysteresis problem. Hysteresis is the result of internal friction within the actuator. Consequently, the response of the actuator in one direction may be slower or markedly different than in the other direction. For actuators having a piston assembly comprising a piston mounted on an actuator rod, the piston assembly sometimes sticks or drags when attempting to move along the wall of the actuator housing.

Therefore, there is a need for a turbocharger actuator which exhibits low hysteresis during its operation. Thus, a primary objective of the present invention is the provision of an actuator with improved hysteresis characteristics.

A further objective of the present invention is the provision of an actuator having a piston with a plurality of grooves thereon for respectively receiving O-rings, the O-rings and the grooves being proportioned such that the O-rings are movable axially within the grooves.

A further objective of the present invention is the provision of a method for reducing hysteresis in a turbocharger actuator.

A further objective of the present invention is the provision of an actuator which is economical to produce, durable and reliable in use, and smoothly operable.

These and other objectives will become apparent from the drawings, as well as from the description and claims which follow.

SUMMARY OF THE INVENTION

The present invention relates to an actuator for an automotive turbocharger. More particularly, the invention relates to an actuator having a plurality of O-rings interposed between a housing and a piston axially movable in the housing. The O-rings themselves are axially movable within their constraining grooves so as to reduce hysteresis. The actuator includes a piston axially movable within a housing. The piston has a plurality of annular grooves thereon, and a plurality of O-rings are loosely restrained respectively in the annular grooves. Thus, the O-rings are axially movable within the grooves as the piston moves within the housing, so as to reduce the hysteresis which normally accompanies movement of the piston within the housing.

BRIEF DESCRIPTION OF THE DRAWINGS

FIG. 3 is a sectional view of the actuator of FIG. 1, taken along line 3—3 with the piston being in raised position.

FIG. 4 is a sectional view similar to FIG. 3, showing the piston in a lowered position.

DETAILED DESCRIPTION OF THE PREFERRED EMBODIMENT

Figures 1, 2:
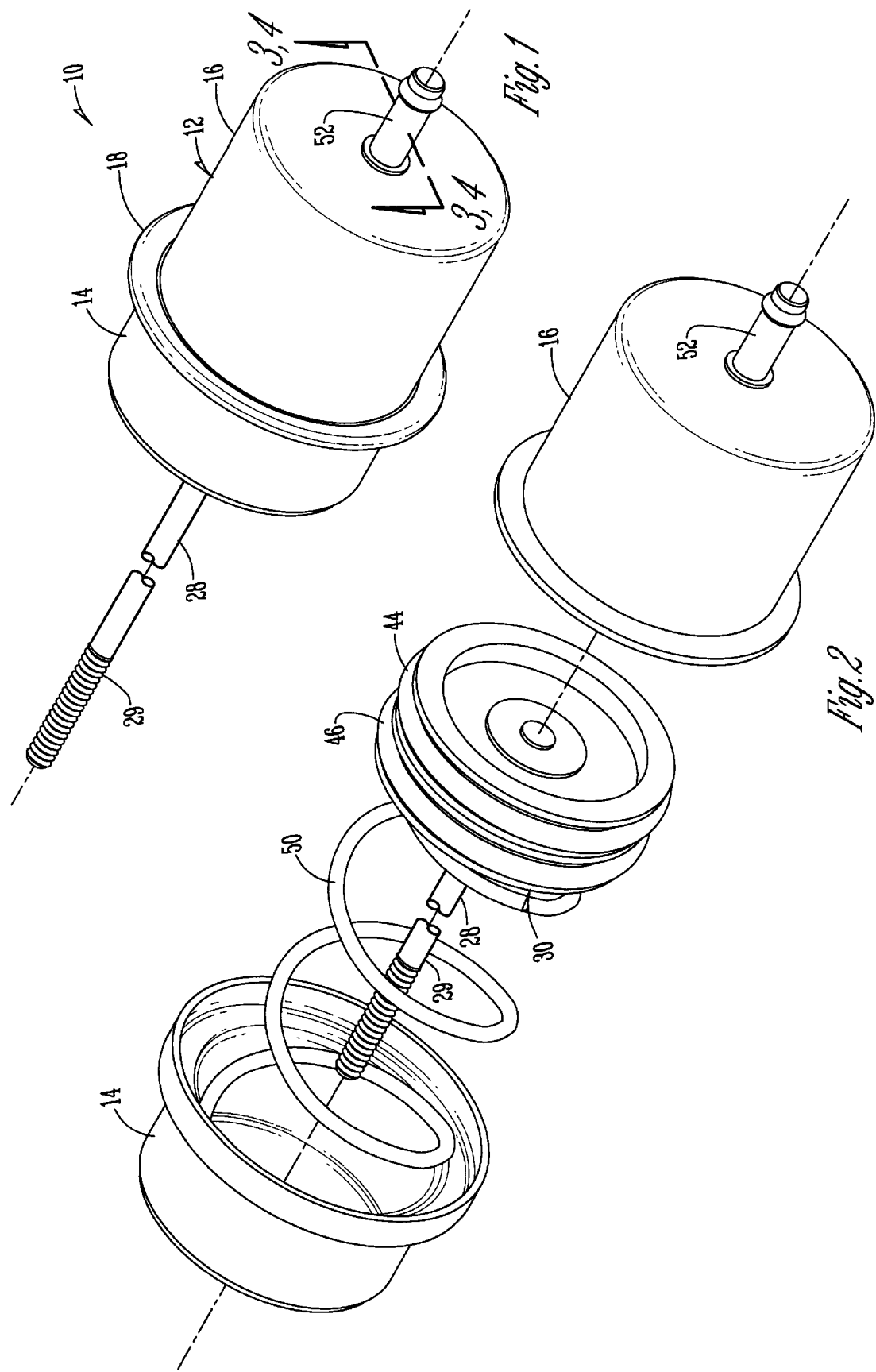
FIG. 1 is a perspective view of the actuator of the present invention.
FIG. 2 is an exploded perspective view of the actuator of FIG. 1.

The actuator of the present invention is generally shown in FIG. 1 and designated by the reference numeral 10. The actuator 10 includes a housing 12, which has a body 14 and a cover 16 crimped together along an airtight seam 18 so as to allow a chamber 20 to be formed (see FIGS. 3 and 4) therein. The typical operating pressure in the chamber 20 is relatively low, usually less than approximately 100 pounds per square inch (PSI). Thus, the housing 12 can be inexpensively produced by forming it from plastic or drawn metal. The housing 12 also includes lower and upper openings 22, 24.

As best seen in FIGS. 2–4, a piston assembly 26 extends through the lower opening 22 and is slidably disposed in the housing 12. The piston assembly 26 includes a rod 28 and a piston 30 secured to the rod 28 for axial movement therewith within the chamber 20. Preferably the rod 28 has threads 29 at its exposed end for connecting with a waste gate valve (not shown) of a turbocharger.

The piston 30 has a shape corresponding to the shape of the inside diameter of the housing, here circular or cylindrical. The piston 30 preferably comprises upper and lower discs 32, 34 interposed between a pair of axially spaced washers 36, 38 attached to the piston rod 28. The enclosed end of the piston rod 28 has a groove 35 and a shoulder 37 thereon for holding the washer 38 on the rod 28. On the other side of the discs 32, 34, welding or similar means of securement fixes the washer 38 on the rod 28. The two piece disc assembly 32, 34 saves weight, material and cost, but other piston configurations will suffice.

Each of the discs 32, 34 includes a circumferential or annular groove 40, 42 therearound for respectively receiving a pair of O-rings 44, 46. The grooves 40, 42 are substantially larger in an axial direction with respect to the rod 28 than the O-rings 44, 46. Thus, the O-rings 44, 46 have clearance to move axially within the grooves 40, 42. However, in a radial direction with respect to the rod 28, the O-rings 44, 46 are slightly larger than the radial clearance provided by the grooves 40, 42, according to well known O-ring sealing conventions. Thus, the O-rings 44, 46 maintain sealed engagement between the discs 32, 34 and the inside wall of the housing 12.

The annular grooves 40, 42 are spaced apart by a shoulder 43 on the piston 30. The width of the shoulder 43 in an axial direction is preferably less than the width of the respective grooves 40, 42.

The O-rings 44, 46 are made of an elastomeric material, such as Buna Nitrile (BunaN), but other materials, including but not limited to Viton® or the like, can be used. For example, one type of O-ring found to work well is available from Wynn's Precision, Inc., 8387 Melrose, Pine Ridge Industrial Park, Lenexa, Kans. 66214, USA under the designation Precision Size 0.330. This O-ring works well when the inside diameter of the housing 12 is approximately 2.470 inches, the diameter of the piston 30 at the grooves 40, 42 is approximately 2.060 inches, the axial width of the grooves 40, 42 is approximately 0.260 inch, and the cross-sectional thickness of the O-rings 44, 46 is 0.210 inch. It will be understood that additional grooves and O-rings can be provided with only minor modifications. Furthermore, the invention is not limited to the housing, piston groove, and O-ring sizes of the above example.

The actuator 10 also includes a conventional guide/seat 48 in the lower portion of the body 14 for guiding the rod 28 and seating the spring 50. The spring 50 is interposed between the piston 30 and the body 14, as shown in FIGS. 3 and 4, to normally urge the piston to the position shown in FIG. 3.

A hollow stem 52 sealingly attaches over the upper opening 24 of the actuator 10 by brazing, welding, or other similar means. The stem 52 is in fluid communication with the turbocharger, such that pressure from the turbocharger reaches the chamber 20 through the hollow stem 52.

FIGS. 3 and 4 illustrate the operation of the actuator 10. In FIG. 3, the pressure supplied through the stem 52 is insufficient to overcome the force of the spring 50. Thus, the piston rests at or near the top of the chamber 20. When additional pressure is communicated to the chamber 20, the force of the spring 50 is overcome, and the piston moves axially toward the body 14. FIG. 4 shows one of many possible resulting positions.

Referring to FIG. 3, the O-rings 44, 46 rest on the upward-facing side of the grooves 40, 42. As the piston 30 is forced downwardly within the chamber 20 (FIG. 4) by pressure from the turbocharger, the piston 30 moves axially downward. However, the O-rings 44, 46 do not have to move with respect to the housing 12 until they are contacted by the downward-facing edges of the grooves 40, 42. Instead, inside diameters of the O-rings 44, 46 slide upwardly along the grooves 40, 42 as the piston 30 moves down. The O-rings 44, 46 do not move relative to the wall of the housing 12. Thus, the piston 30 can commence its initial movement without being impeded by significant friction from the O-rings 44, 46 against the wall of the housing 12. The piston 30 develops downward inertia before further engaging the O-rings 44, 46. This downward inertia makes it easier to overcome the friction between the O-rings 44, 46 and the inside wall of the housing 12, thereby reducing hysteresis.

It is also possible, as an alternative explanation, that the O-rings 44, 46 roll axially within the groove 40, 42. Because rolling or slide/rolling friction is less than the friction for pure sliding, the invention reduces hysteresis. Regardless of whether the O-rings roll or slide within the grooves, the results are the same. Because of the axial movement of the O-rings 44, 46, they start their movement more smoothly and drag less against the inside wall of the housing 12. The lower drag leads to lower hysteresis. The actuator 10 operates with less resistance, more smoothly and predictably.

O-rings of various cross-sections, including circular, rectangular, elliptical, and square, can be utilized with this invention. This invention is applicable to hydraulic or pneumatic applications.

In the drawings and specification there has been set forth a preferred embodiment of the invention, and although specific terms are employed, these are used in a generic and descriptive sense only and not for the purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. An actuator for a turbocharger having a waste gate valve, comprising:

a housing having a central longitudinal axis;

a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

an actuator rod attached to the piston and adapted for attachment to the waste gate valve of the turbocharger.

2. The actuator of claim 1 wherein the actuator rod has a threaded end adapted to attach to a waste gate valve of the turbocharger.

3. The actuator of claim 1 wherein the O-ring has an inner diameter and an outer diameter such that the O-ring is capable of moving axially within the groove as the piston starts to move axially with respect to the housing.

4. An actuator for a turbocharger having a waste gate valve, comprising:

a housing having a central longitudinal axis;

a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

the housing defining a cavity surrounding the central longitudinal axis and the piston being slidable within the cavity along the axis.

5. The actuator of claim 2 wherein the cavity is cylindrical.

6. An actuator for a turbocharger having a waste gate valve, comprising:

a housing having a central longitudinal axis; a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

the housing having an inlet port above the piston, the inlet port providing fluid communication between the cavity and the turbocharger upstream of the waste gate valve.

7. An actuator for a turbocharger having a waste gate valve, comprising:

a housing having a central longitudinal axis;

a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

a spring for engaging and yieldingly urging the piston toward a first position.

8. An actuator for a turbocharger having a waste gate valve, comprising:

a housing having a central longitudinal axis; a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

the plurality of angular grooves comprising two annular grooves spaced apart by a shoulder on the piston, the shoulder having a width in the axial direction less than the width of the respective grooves.

9. An actuator for a turbocharger having a waste gate valve, comprising:

a housing having a central longitudinal axis; a piston having a plurality of annular grooves thereon, the piston being slidably disposed with respect to the housing along the longitudinal axis, each of the plurality of annular grooves having a width and depth and thereby being adapted to respectively receive an O-ring therein, the piston having a shoulder thereon interposed between and defined by an adjacent pair of the grooves;

the O-rings being sealingly engaged between the piston and the housing and having a cross-sectional width along the longitudinal axis;

the grooves having a width along the longitudinal axis substantially larger than the width of the O-rings such that the O-rings can move axially within the grooves;

the piston comprising a pair of discs joined together and mounted on an elongated rod.

10. A method of reducing hysteresis in a turbocharger actuator, comprising:

providing a housing with an inner wall and a longitudinal axis;

providing a piston on a piston rod, the piston having a plurality of annular grooves thereon;

installing an O-ring respectively in each of the annular grooves on the piston, the O-ring having axial clearance within the groove;

inserting the piston into the housing and along the longitudinal axis so as to bring the O-rings into sealing engagement between the piston and the inner wall of the housing;

exerting an axial force on the piston rod;

moving the O-rings in an axial direction within the axial clearance within the respective grooves without moving the O-rings relative to the inner wall of the housing; and continuing to exert an axial force on the piston rod until the O-rings move with respect to the inner wall of the housing.

11. The method of claim 10 further comprising ceasing to exert an axial force on the piston rod, thereby causing the O-rings to rest against one edge of the grooves.

12. The method of claim 10 further comprising initiating an axial force on the piston rod, thereby causing the O-rings to move axially away from one edge of the grooves.

* * * * *